United States Patent [19]

Prevorsek et al.

[11] 4,374,973

[45] Feb. 22, 1983

[54] POLYCARBONATES WITH SUPPRESSED AGING CHARACTERISTICS

[75] Inventors: Dusan C. Prevorsek, Morristown; Bruce T. DeBona, Madison; Yali Kesten, Highland Park, all of N.J.

[73] Assignee: Allied Corporation, Morris Township, Morris County, N.J.

[21] Appl. No.: 283,330

[22] Filed: Jul. 15, 1981

Related U.S. Application Data

[63] Continuation of Ser. No. 180,716, Aug. 25, 1980, abandoned, which is a continuation of Ser. No. 965,119, Nov. 30, 1978, abandoned.

[51] Int. Cl.$^3$ .................... C08G 63/64; C08G 63/62
[52] U.S. Cl. .................... 528/191; 528/196; 528/204
[58] Field of Search ............ 528/191, 193, 196, 204; 260/463

[56] References Cited

U.S. PATENT DOCUMENTS

| | | | |
|---|---|---|---|
| 3,028,365 | 4/1962 | Schnell et al. | 528/204 |
| 3,169,121 | 2/1965 | Goldberg | 528/193 |
| 3,220,976 | 11/1965 | Goldberg | 528/196 |
| 3,553,167 | 1/1971 | Schnell et al. | 528/204 |
| 4,064,108 | 12/1977 | Inata et al. | 528/193 |
| 4,107,143 | 8/1978 | Inata et al. | 528/193 |
| 4,156,069 | 5/1979 | Prevorsek | 528/182 |

FOREIGN PATENT DOCUMENTS

| | | |
|---|---|---|
| 2122574 | 11/1972 | Fed. Rep. of Germany . |
| 1228041 | 8/1960 | France . |
| 882049 | 11/1961 | United Kingdom . |
| 1047682 | 11/1966 | United Kingdom . |

*Primary Examiner*—Theodore E. Pertilla
*Attorney, Agent, or Firm*—A. M. Doernberg; R. A. Harman

[57] ABSTRACT

Polycarbonate copolymers from bisphenol-A containing terephthalate moieties constituting 5 or 10 mol percent of the polymer, whereby after long exposure to working temperature the polymer retains Izod impact resistance of at least 9 ft. -lbs. per inch of notch.

2 Claims, No Drawings

POLYCARBONATES WITH SUPPRESSED AGING CHARACTERISTICS

This is a continuation of application Ser. No. 180,716 filed Aug. 25, 1980, now abandoned, which was a continuation of application Ser. No. 965,119, filed Nov. 30, 1978, now abandoned.

BACKGROUND OF THE INVENTION

Polycarbonate polymers from bisphenol-A molecules, linked together by carbonate linkages as obtained by condensing bisphenol-A and phosgene, are a well known and very useful class of polymers. One of their defects, however, which has been noted in studies by a number of workers, is the drastic drop to impact resistance of these polymers resulting from thermal treatment at temperatures between 70° C. and the polycarbonate glass transition temperature of about 150° C. For example, such loss of impact resistance is discussed in an article by L. J. Broutman et al. in *Polymer Engineering and Science*, Vol. 16 of 1976, page 74.

It has been proposed heretofore to modify polycarbonate polymers by introducing polyester units into the polymer chain, in particular polyester units from bisphenol-A ("BPA") and terephthalic acid ("TPA"), together with carbonate units from phosgene (USP 3 169,121 of Feb. 9, 1965 to E. P. Goldberg). A thorough reinvestigation of such copolymers resulted in greatly improved products, especially improved in melt processability and heat deformation temperature or glass transition temperature, $T_g$. (Allowed U.S. patent application Ser. No. 764,623 of Prevorsek and Kesten filed Feb. 1, 1977 now U.S. Pat. No. 4,156,069 of May 22, 1979). Such copolymers have mol ratios of the BPA:TPA:carbonate moieties in the range 1:0.4:0.6–1:0.65:0.35.

SUMMARY OF THE INVENTION

We have now found that the above noted rapid loss of impact resistance in polycarbonate polymers can be dramatically reduced by copolymerizing only small amounts of TPA moieties, with polycarbonate polymers, namely amounts of such moieties constituting 5 or 10 mol percent of the polymer, corresponding to mol ratios of BPA:TPA moieties of 1:0.1 or 1:0.2. Thereby, instead of dropping precipitously, when measured on a 0.125 inch thick plate, to a plateau of less than 3 ft.-lbs. per inch of notch in ten hours or less of heating at 120° C., the impact resistance of the resulting copolymer remains at least 9 ft.-lbs. per inch of notch over times of heating such as 90 hours or more at 120° C. or above. Moreover the copolymers are soluble in solvents such as dichloromethane and can be molded in fused state to form impact-resistant articles.

DETAILED DESCRIPTION

Principles Involved in Embrittlement Testing

It is recognized in the art, such as the above cited Broutman et al. article, that after a period of heating at a temperature below the glass transition temperature of the polymer ("$T_g$"), thermoplastic polymers generally show embrittlement (i.e. show lowered impact resistance measured at given temperature such as 23° C.), until a plateau is reached; and that the heating period required to reach the plateau is shorter, the higher the temperature used. Other things being equal, polymers of similar structure but having different $T_g$'s show similar extent of embrittlement, upon heating for a given time period and at temperature, T, which differs by a constant value, $\Delta$, from the $T_g$ value for the polymer under test; i.e. upon heating at temperature $T = T_g - \Delta$.

As disclosed in the above cited patent application Ser. No. 764,623 incorporation of TPA moieties—in the range from 20 mol percent of the total polymer, upward-in bisphenol-A polycarbonate results in a marked and progressive increase of polymer $T_g$'s, specifically in $T_g$'s of 170° C. and up compared to 150° C. for the polycarbonate. It would follow that the relative tendency of BPA:TPA:carbonate copolymers to embrittle on long exposure to working temperatures thereof can be determined by heating each polymer at elevated temperature $T = T_g - \Delta$ for equal long periods. The impact resistance of each such polymer containing TPA will thereby be brought down, within comparable times of treatment, to or near the plateau characteristic of that polymer. Such procedure therefore constitutes a valid accelerated embrittlement test to determine relative extent of embrittlement after long term exposure of the above polycarbonates, containing TPA moieties, to temperatures at which they would be used (i.e. temperatures substantially below the $T_g$ of the polymer).

The copolymer of this invention, above-described, can be produced using essentially the same procedure as described in the above cited allowed U.S. patent application, Ser. No. 764,623 with adjustment of the mol ratio of BHA:terephthaloyl chloride ("TPC") in the feed to the value desired in the final copolymer of 1:0.1 or 1:0.2. The reaction mixture thus formed, containing low molecular weight BPA/TPA polyester and unreacted BPA, is then phosgenated with phosgene to introduce carbonate linkages to BPA moieties, and is worked up as described in said allowed application Ser. No. 764,623 whereby the polymer obtained has a mol ratio of BPA:TPA of moieties 1:0.1 or 1:0.2.

We believe that the improved resistance of our polycarbonate copolymers to embrittlement, as compared to conventional polycarbonate, combined with their high level of impact resistance, is due to incorporation of the right comonomer in narrow, critical proportions. The chosen comonomer, terephthaloyl chloride has the effect even in the small proportions used, we have found, of increasing appreciably the density of chain entanglement in the resulting polymers, as estimated by comparing the temperature of minimum radius of curvature for the torsional modulus vs. temperature plots obtained from different polymers of similar molecular weights. We believe that this higher chain entanglement is responsible, at least in part, for the observed higher resistance to embrittlement; and may be associated with higher proportions of the stiffer segments in the polymer chains.

At the same time, we find that the specific monomer does not, in the above noted critical proportions, severly decrease the very high impact resistance obtainable in conventional unaged polycarbonate and does not decrease the high $T_g$ (150° C.) of polycarbonate.

A most unusual observation in our tests of resistance to embrittlement is that the polymers of our invention, upon aging, show not only improved resistance to embrittlement over the base polymer lacking the added TPA moiety, but actually show at content of about 5 mol percent TPA moiety a peak impact resistance versus aged copolymers having smaller or greater proportions of the comonomer.

EXAMPLES

The following Examples are illustrative of our invention and set forth the best mode now contemplated by us for carrying out the invention but are not to be interpreted as limiting.

Temperatures are given in °C. in the Examples.

Poly(ester carbonate) containing 0.05 mol of terephthalate per mol of BPA

Bisphenol-A of reagent grade was used without further purification. Terephthaloyl chloride was obtained from various commercial sources and was recrystallized from n-hexane until a minimum melting point of 80° was obtained. Practical grade pyridine and dichloromethane were distilled before use. All other reagents were practical grade and were used as received.

Polymer preparations were conducted in a hood into which standard visual phosgene indicator papers were placed at several locations.

Into a 12 L. (liter) 3-neck flask equipped with a mechanical stirrer, gas inlet fitting, condenser, gas exit traps (aqueous KOH) and water bath at 25° was placed 685 g (3 mols) of pure bisphenol-A. Anhydrous pyridine (725 mL, 9 mols) was added, after which the stirrer was started and air purged from the reaction flask with dry nitrogen gas. After complete dissolution of the bisphenol, anhydrous dischloromethane (6 L) was added with continued stirring and nitrogen gas flow. A solution of terephthaloyl chloride (30.5 g, 0.15 mols) in dichloromethane (305 mL) was then prepared and filtered as rapidly as possible to remove any insoluble matter. This acid chloride solution was added in a single stream over several seconds time thorough stirring to the bisphenol solution. After ten minutes a solution of p-t-butylphenol (16.7 g, 3.5 mol % based on bisphenol) in dichloromethane (150 mL) was added to the contents of the reaction flask. At this point solid $CO_2$/acetone was added to the condenser, nitrogen flow discontinued and the gas inlet fitting connected to a phosgene tank equipped with a gas flowmeter. Phosgene gas was then fed into the vapor space of the reaction flask at a rate of about 225 mL/min. which corresponds to about 1 g/min. (Thorough stirring is required in order to dissolve the phosgene as rapidly as it enters.) Addition time for the theoretical 2.85 mols of phosgene was about 2.5 hours during which time the viscosity of the solution increased and pyridinium hydrochloride precipitated as small granular crystals. Addition of phosgene in excess of that theoretically required was assured when by visual observation the viscosity of the solution no longer increased as phosgene addition was continued. Nitrogen gas flow was then restarted to purge the vapor space of gaseous phosgene; and the slight excess of phosgene in solution was destroyed by careful addition of methanol (100 mL) in small portions.

The polymer solution was then filtered through a coarse sintered glass funnel to remove most of the pyridinium hydrochloride (some of which remains dissolved in the filtrate). The filtered polymer solution was precipitated into 20 L of acetone with vigorous high shear agitation. (For best results the polymer solution should be added as a continuous stream over about one hour.) After precipitation, stirring was continued for at least one hour more so that the polymer granules would attain adequate hardness in order not to agglomerate when stirring was stopped. The polymer granules were allowed to settle whereupon the supernatant liquid was siphoned and discarded. The polymer was washed on a filter funnel with acetone and then stirred with water (4 L) at 70°–80° for one-half hour to extract pyridinium hydrochloride. The polymer was filtered, washed with acetone and dried on the filter funnel overnight. The polymer was further purified after dissolution in dichloromethane (10% solution by wt.; ca. 8 L) by reprecipitation and washing as described above at least once more, and finally dried at 110° in a vacuum oven at 1 torr for 24 hours. The final yield (two precipitations) of white solid polymer was about 600 g.

The polymer had viscosity number ($N_{sp}/C$) of 0.7 dL/g at 25° in 60/40 wt. phenol/sym-tetrachloroethane. The ratio of bisphenol to terephthalate moieties in the polymer was 1:0.05 as determined by infrared absorbance ratios of carbonate and ester bands. The glass transition temperature, $T_g$, of the polymer was 157° by DSC.

The polymer powder was thoroughly vacuum dried at 100° C. and immediately compression molded into 5"×5"×0.125" plates at 315° C. for 7 minutes. (The viscosity number did not change on molding by more than 0.02 dL/g). The plates were machined into standard IZOD test specimens (as given in ASTM D256, Impact Resistance of Plastics and Electrical Insulating Materials, Method A). The test specimens were heat aged for various periods at temperature about $T_g-30°$ in an argon atmosphere, and the IZOD impact resistance was then determined on each specimen (at room temperature) as described in ASTM D256, method A.

Similarly, a poly(ester carbonate) having a component ratio of 1:0.1:0.9, BPA:TPA:carbonate was prepared as in the above example except that 61 g (0.3 mole) of terephthaloyl chloride in 610 ml dichloromethane was used in the first stage of reaction.

Other BPA/TPA/carbonate polymers shown in the Table below were prepared in essentially the same manner, by using that proportion of terephthaloyl chloride in the reaction mixture which corresponds to the proportion of the TPA moiety in the resulting polymer.

The following table shows the results of the long term embrittlement tests, carried out as above described in the copolymers of the above Examples, in terms of Izod impact resistance at room temperature, after heating for at least 120 hours; and shows, for reference, the $T_g$ and the viscosity number for each polymer, and the results of such tests upon comparison polymers having TPA moiety outside the range of this invention (or no TPA).

TABLE

|  | Ex. 1 | Ex. 2 | Ex. 3 | Ex. 4 | Ex. 5 | Ex. 6 |
|---|---|---|---|---|---|---|
| Mols TPC per mole of BPA in feed | 0 | 0.05 | 0.1 | 0.2 | 0.3 | 0.5 |
| Mol % TPA Moiety in Polymer | 0 | 2.5 | 5 | 10 | 15 | 25 |
| Izod Impact Resistance (ft-lbs per inch of notch) | 3 | 3 | 13[1] | 10[2] | 7[3] | 6–7 |
| Polymer $T_g$ (by DSC) °C. | 150° | 157° | 158° | 165° | 173° | 180–185° |
| Viscosity number ($N_{sp}/C$) | 0.70 | 0.70 | 0.73 | 0.80 | 0.76 | ca 0.7 |
| Testing | 120° | 124° | (125°, 135° | 143° | ca 150° |

TABLE-continued

| | Ex. 1 | Ex. 2 | Ex. 3 | Ex. 4 | Ex. 5 | Ex. 6 |
|---|---|---|---|---|---|---|
| Temperature | | | 150°) | | | |

(1)Value is practically constant between 12 and 15 throughout tests (120 hours, 144 hours at 125°, 150°).
(2)Value is practically constant between 9 and 12 throughout test (190 hours).
(3)Values drop from 8-9 at 2 hours to 6-7 at 20-120 hours and to 5-6 at about 180 hours.

It will be observed from the table that maximum impact resistance after long term exposure to heat at working temperatures is found in the copolymer containing about 5 mol percent TPA moieties, i.e. in the 1:0.1:0.9 copolyester (expressed as molar ratio of BPA:TPA:carbonate moieties).

We claim:

1. Polycarbonate of improved age-resisting properties, consisting predominantly of bisphenol A moieties joined together by carbonate linkages, wherein the improvement consists in a content of essentially only copolymerized terephthalate moieties constituting 5 or 10 mol percent of the polymer, such that the polymer after exposure in the form of a 0.125 inch thick plate to temperature of 120° C. for at least 90 hours retains Izod impact resistance at room temperature, as measured by ASTM test D256 of at least 9 ft.-lbs. per inch of notch.

2. Polycarbonate of claim 1 wherein the copolymerized moiety is 5 mol percent of the polymer.

* * * * *